L. TAYLOR.
METHOD AND APPARATUS FOR DETERMINING PROPORTIONS IN COMPOUNDS AND MIXTURES.
APPLICATION FILED SEPT. 11, 1908.
940,217.
Patented Nov. 16, 1909.
3 SHEETS—SHEET 1.
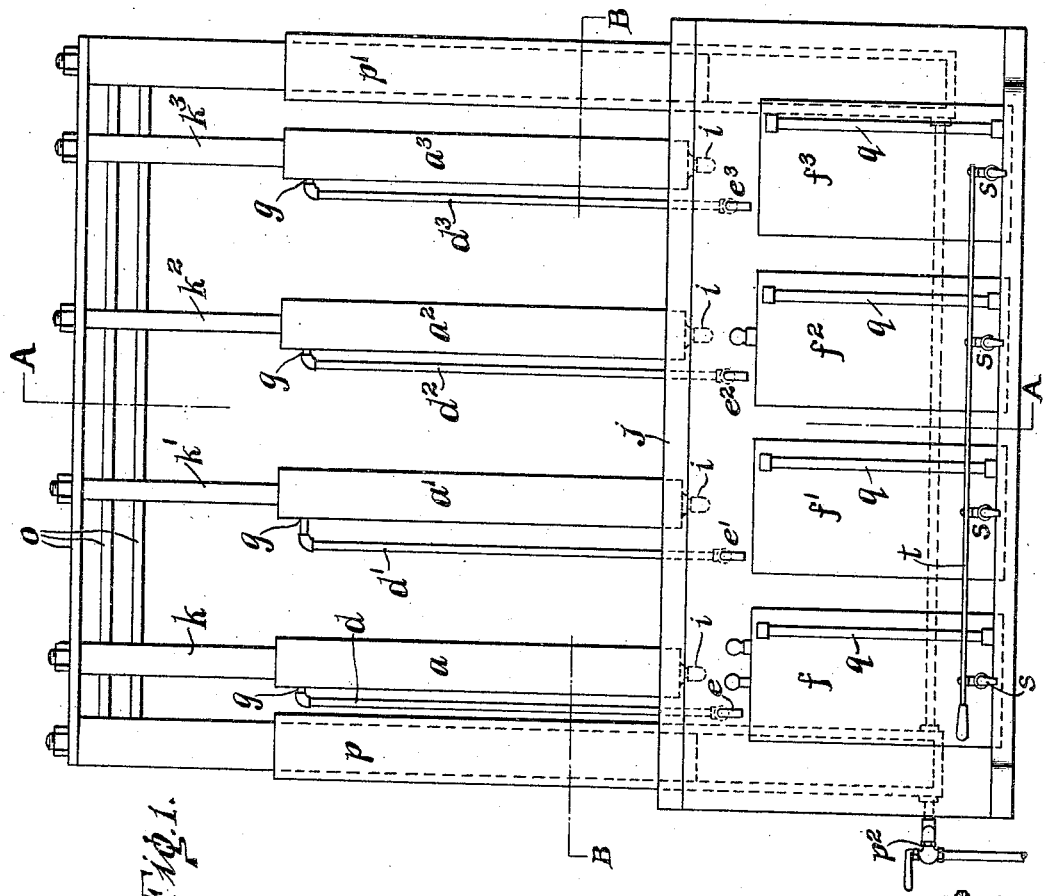
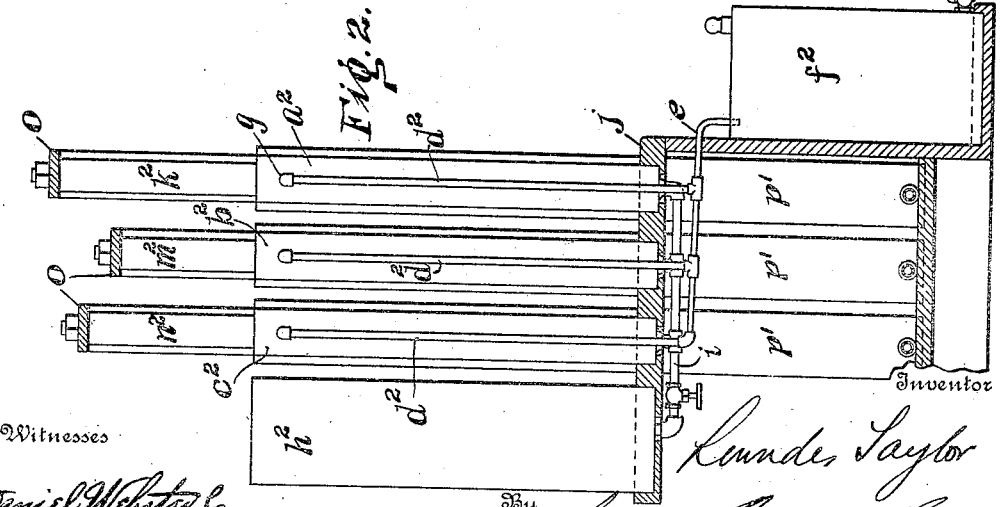

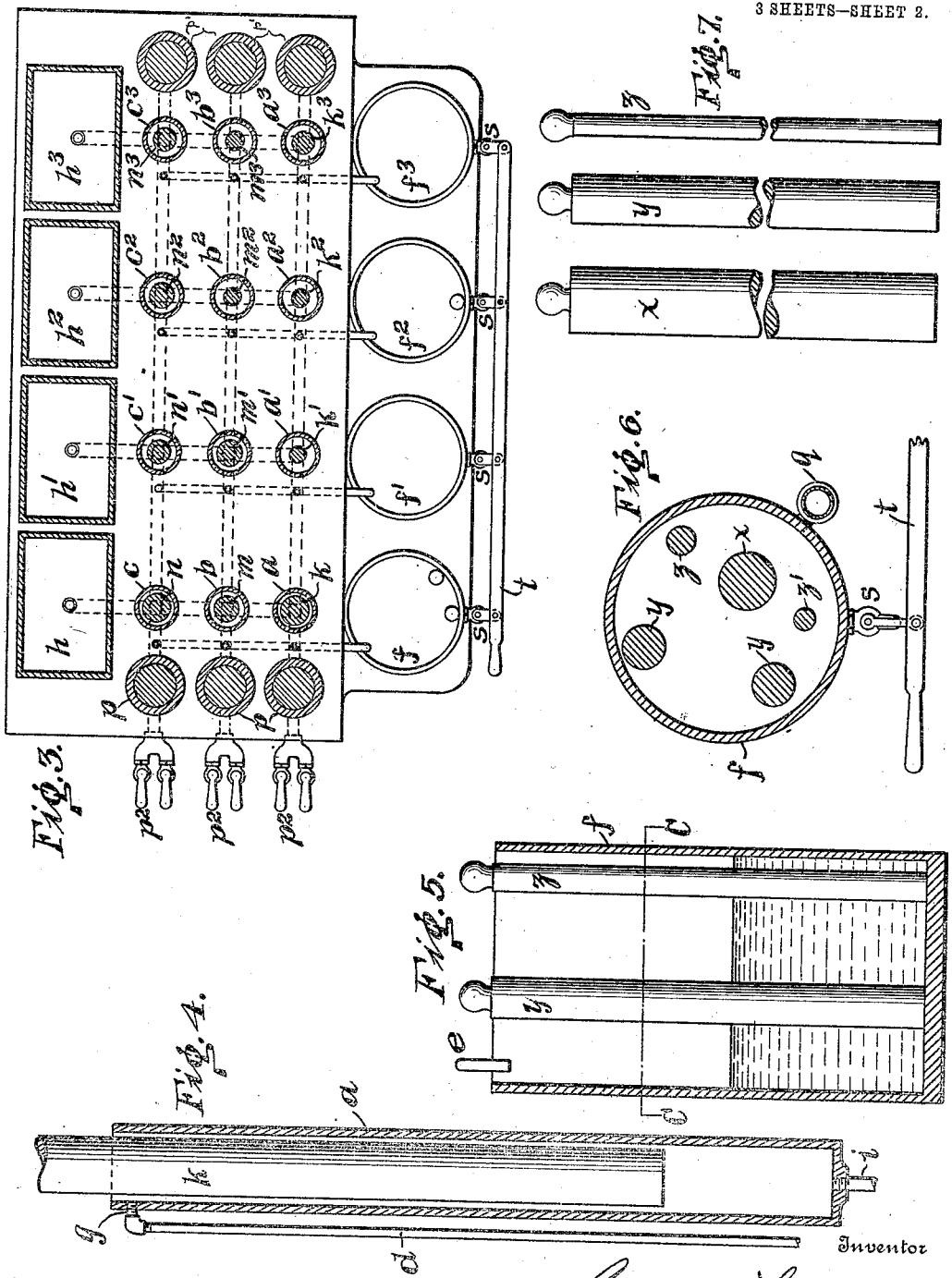

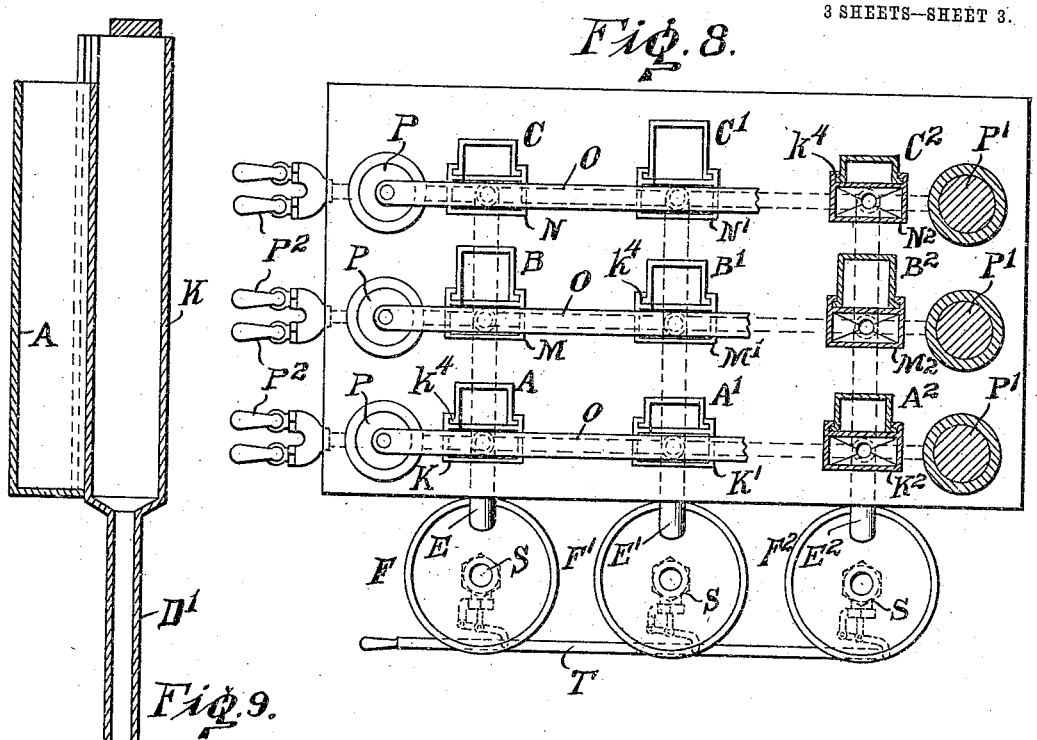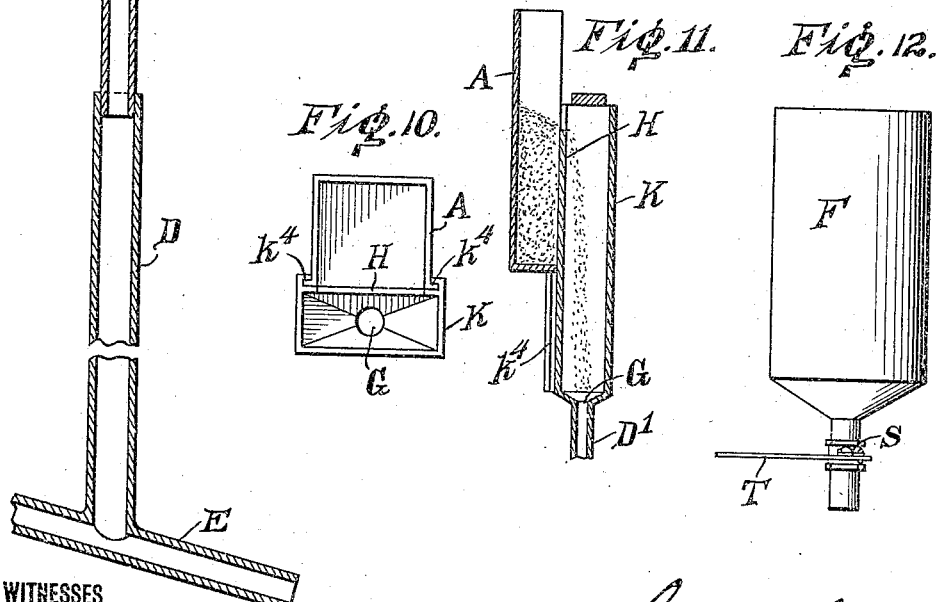

UNITED STATES PATENT OFFICE.

LOWNDES TAYLOR, OF SWARTHMORE, PENNSYLVANIA.

METHOD AND APPARATUS FOR DETERMINING PROPORTIONS IN COMPOUNDS AND MIXTURES.

940,217.  Specification of Letters Patent.  Patented Nov. 16, 1909.

Application filed September 11, 1908.  Serial No. 452,556.

*To all whom it may concern:*

Be it known that I, LOWNDES TAYLOR, a citizen of the United States, and a resident of Swarthmore, county of Delaware, State of Pennsylvania, have invented an Improvement in Methods and Apparatus for Determining Proportions in Compounds and Mixtures, of which the following is a specification.

More particularly my invention relates to a method of determining the relative proportions of substances to be mixed or compounded to produce a given ratio between the characteristics of such substances, and to apparatus adapted for practicing such method. For example; supposing it be desired to determine a certain balanced ration, *i. e.* a ration in which the characteristics, whether physiological, mechanical or economic, will bear a certain ratio to one another, my method is designed to determine the relative proportions of the several ingredients which shall be taken or combined to produce such ratio. Supposing it be desired to produce a ration of bread, meat and potatoes having a certain ratio between the fats, carbo-hydrates and protein—those being characteristics—my method is designed to determine the relative proportions of bread, meat and potatoes which shall be taken to produce that ratio of those characteristics. Not only may the proportions of the ingredients be determined for any ratio of such physiological characteristics as those mentioned, but also for such characteristics as weight, bulk, cost, woody waste, total of calories, and chemical constituents; in fact any characteristic of the ingredients of the ration may be included and the proportions of the ingredients may be determined to produce any desired ratio between such characteristic and any number of other characteristics of the ingredients.

Broadly stated the method consists essentially in simultaneously displacing a fluid, or its equivalent, in separate volumes proportional to the ratio of the chosen characteristics of each ingredient, collecting together the displaced volumes representing the same characteristic of all the ingredients, and repeating the first operation for the different ingredients until there is established between the collected volumes of fluid the desired ratio of the characteristics represented by such collected volumes of fluid.

With the particular form of apparatus which is shown in the drawings, water, contained in a series of separate receptacles or cylinders, is displaced by plungers of diameters proportional to the ratio of the several characteristics which they and their cylinders represent. It follows that the volumes of water displaced by the depression of these plungers will be proportional to the ratios of the characteristics. There is a separate set of these cylinders and plungers for each ingredient, so that the depression of each set of plungers will displace a series of separate volumes of water proportional to the diameters of the plungers and consequently to the ratio of the characteristics, the separate volumes displaced by the corresponding plungers for the different ingredients and consequently representing the same characteristic flow into the same receptacle or receiver; and consequently each receptacle or receiver contains only the displaced volumes representing one characteristic. The cubical contents of these receptacles are made proportional to the ratio which is to be established between the characteristics. The separate sets of plungers representing the different ingredients are depressed until, by experiment, the same level of water is established in the set of receptacles or receivers representing the characteristics. The desired ratio has then been reached and the relative proportions of the ingredients required to establish that ratio is indicated by the relative extent of the movements of the different sets of plungers. As the plungers in each set are connected together by a bar the ratio of these movements for the different sets may be readily determined by the positions of the respective bars.

While I show and describe the displacement of water in volumes proportional to the ratio of the chosen characteristics by the immersion therein of plungers of proper diameter, my invention is not limited to such displacement of water, but may be applied to other fluids, or the equivalent thereof, such as fine shot or sand, and it is to be understood that where I use the term "fluid" in the claims I mean to include such equivalents. It is sufficient for the method that there shall be simultaneously displaced or discharged separate volumes of such fluid, or its equivalent, proportional to the ratio of the chosen characteristics in each ingredient, and that the displaced volumes representing the same characteristic shall be collected together, and that such operations shall be repeated until the desired ratio is established between the collected volumes representing the different characteristics.

In the accompanying drawings: Figure 1 is a side elevation of an apparatus embodying the invention; Fig. 2 is a transverse vertical section on the line A—A of Fig. 1; Fig. 3 is a horizontal section on the line B—B of Fig. 1; Fig. 4 is a vertical sectional view on an enlarged scale of one of the cylinders representing a characteristic. Fig. 5 is a vertical sectional view on an enlarged scale of one of the receiving vessels containing capacity reducers, Fig. 6 is a transverse horizontal section of the same on the line C C of Fig. 5, Fig. 7 shows some of the capacity reducers in side elevation. Fig. 8 is a plan view with part in horizontal section of another form of apparatus adapted for carrying out the method and embodying the invention; Fig. 9 is a vertical sectional view on an enlarged scale of one of the "characteristic" holders and the displacing means of Fig. 8; Fig. 10 is a plan view of the "characteristic" holder and displacing means of Fig. 9; Fig. 11 is a vertical sectional view of the same on a reduced scale illustrating the operation; and Fig. 12 is a side elevation of one of the receiving vessels of Fig. 8.

$a$ $a'$ $a^2$ $a^3$ are the cylinders of one set representing one ingredient. $b$ $b'$ $b^2$ $b^3$ and $c$ $c'$ $c^2$ $c^3$ are the cylinders of other sets representing other ingredients. These cylinders are open at the top near which is placed the outlet $g$ from which leads a tube. The tubes from corresponding cylinders in the different sets are connected with a common tube which discharges to a receptacle or receiver. Thus the tubes $d$ from the cylinders $a$, $b$, $c$, connect with the tube $e$ which discharges into the receiver $f$; the tubes $d'$ from the cylinders $a'$ $b'$ $c'$ connect with the tube $e'$ discharging into the receiver $f'$; the tubes $d^2$ from the cylinders $a^2$ $b^2$ $c^2$ with the tube $e^2$ discharging into the receiver $f^2$, and the tubes $d^3$ from the cylinders $a^3$ $b^3$ $c^3$ with the tube $e^3$ discharging into the receiver $f^3$.

Any suitable means may be used for filling the cylinders. For this purpose I have shown tanks $h$ $h'$ $h^2$ $h^3$ each connected with the bottom of corresponding cylinders $a$ $b$ $c$ &c. by suitable pipes $i$.

As shown the cylinders $a$ $b$ $c$ &c. are placed upright on a suitable table $j$ under which extend the tubes $e$ $e'$ &c. leading to the receptacles $f$ $f'$ &c., the latter being at a lower level so that the water will flow into them by gravity.

$k$ $k'$ $k^2$ $k^3$ are the plungers for the set of cylinders $a$ $a'$ &c. representing one of the ingredients; and $m$ $m'$ $m^2$ $m^3$ and $n$ $n'$ $n^2$ $n^3$ are the sets of plungers for the other sets of cylinders $b$ $b'$ &c. and $c$ $c'$ &c. respectively and represent other ingredients. The plungers in each set are placed over their cylinders and are adapted to move in them. The plungers in each set are connected with a common bar $o$ which may be raised and lowered by any suitable means. For this purpose I have shown hydraulic lifts $p$ $p'$ connected with each bar and controlled by suitable valves $p^2$. The diameters of the plungers in each set are made proportional to the ratio of the characteristics of the ingredients which the set represents. Thus, for purposes of illustration, let us suppose that the set of plungers $k$ $k'$ &c. with the cylinders $a$ $a'$ &c. represent meat, the plungers $m$ $m'$ &c. and the cylinders $b$ $b'$ &c., bread, and the plungers $n$ $n'$ &c. and the cylinders $c$ $c'$ &c. potatoes; and that the characteristic represented by the row of plungers $k$ $m$ $n$ and cylinders $a$ $b$ $c$ is fat, that represented by the row of plungers $k'$ $m'$ $n'$ and cylinders $a'$ $b'$ $c'$ carbohydrates, and that of the row of plungers $k^2$ $m^2$ $n^2$ and cylinders $a^2$ $b^2$ $c^2$ protein. The sizes of the plungers $k$ $k'$ and $k^2$ will be made proportional to the ratio of the fats, carbohydrates and protein in meat, the sizes of the plungers $m$ $m'$ and $m^2$ will be proportional to the ratio of those characteristics in bread, and the sizes of the plungers $n$ $n'$ and $n^2$ will be proportional to the ratio of those characteristics in potatoes.

It is apparent that when the plungers $k$ $k'$ $k^2$ are depressed they will displace from the cylinders $a$ $a'$ $a^2$ volumes of water proportional to their relative diameters and consequently proportional to the ratio of fat, carbohydrates and protein in meat, so the plungers $m$ $m'$ $m^2$ when depressed will displace from the cylinders $b$ $b'$ $b^2$ volumes of water proportional to the ratio of those characteristics in bread, and the plungers $n$ $n'$ $n^2$ will similarly displace volumes proportional to the ratio of those characteristics in potatoes. The volumes displaced from the cylinders $a$ $b$ $c$ representing only the fats will pass by the pipe $e$ into the receiver $f$ representing the total fat characteristic; the volumes displaced from the cylinders $a'$ $b'$ $c'$ representing only the carbohydrates will pass by the pipe $e'$ into the receiver $f'$ representing the total carbohydrate characteristic, and those displaced from the cylinders $a^2$ $b^2$ $c^2$ will pass by the pipe $e^2$ into the receiver $f^2$ representing only the protein characteristic. There will thus be collected in each of the receivers $f$ $f'$ $f^2$ the displaced volumes representing the sum of one characteristic of all the ingredients, and obviously when the separate volumes thus displaced and collected in the receivers $f$ $f'$ $f^2$ are made proportional to the desired ratio of fat, carbohydrate and protein, the proportion of meat, bread and potatoes that should be taken to produce that ratio will be indicated by the relative extent of movement of the bars $o$ of the different sets of plungers $k$ &c, $m$ &c and $n$ &c. This proportion may be taken either in bulk or weight, but it is usually better to consider the proportions by weight and to treat the bulk as a characteristic which may be represented by proper plungers and cylinders and included in the ratio of characteristics. To enable this ratio between the volumes collected in the several receivers to be easily established I prefer to employ receivers of like initial cubical capacity and to establish the desired ratio by reducing the cubical contents of the several receivers by the introduction of suitable capacity reducers, so that the desired ratio will be established when the water in the receivers is at the same level.

As shown in the drawings each of the receivers is provided with a sight or gage-tube $q$ communicating with the receiver at the bottom. The cubical contents of any cylindrical receiver is represented by the formula $$R^2\pi h + r^2\pi h,$$

in which R the radius of the receiver, $r$ the radius of the sight or gage-tube $q$, and $h$ the height of the contained fluid. By the introduction of cylindrical bodies into the receiver the resulting cubical contents will be $$R^2\pi h + r^2\pi h - x^2\pi h$$

in which $x$ equals the radius of the cylindrical reducer which is introduced. The dimensions of the cylindrical reducers, or the value of $x$, is determined from the following formula;

$$\frac{R^2\pi h + r^2\pi h}{w} = x^2\pi h,$$

in which $w$ represents any fractional part. Therefore, for the same height or value of $h$, $$\frac{R^2 + r^2}{w} = x^2.$$

If for example, R=5 inches and $r$=.5 inches and $w$ be taken at 10, $x$ will equal 1.589 inches, that is to say a cylindrical reducer of that diameter introduced into a receiver of 5 inches in diameter having a sight tube of .5 inches will reduce its cubical contents one-tenth. Other reducers may in like manner be prepared for hundredths, thousandths and other fractional parts. Having then a series of such reducers $x$, $y$, $z$, $z'$ the cubical contents of the receivers $f$ $f'$ $f^2$ &c. may be brought into any desired ratio by the introduction of the proper reducers as shown in Figs. 5 and 6. It follows therefore that when the level of the water, as shown by the gage tubes $q$, is the same in the receivers, the desired ratio will be established. For convenience the outlets $s$ from the receivers may be opened simultaneously to discharge the contents by means of valves controlled by a common lever or bar $t$.

For simplicity of illustration and description I have shown only three sets of plungers and associated cylinders and only four plungers and cylinders in each set, it is to be understood however, that any number of sets may be employed according to the number of ingredients or substances to be taken, with any number of plungers and cylinders in each set according to the number of characteristics to be considered. In my description I have supposed the ration to be made up of meat, bread and potatoes only and have considered only the characteristics of fat, carbohydrates and protein, but obviously other substances such as milk, eggs, oatmeal and green vegetables might have been added to the ration and other characteristics such as the woody waste, starch and sugar might have been considered.

When any of the characteristics under consideration is lacking from any ingredient or substance, the corresponding plunger from the set representing such ingredient is omitted. The corresponding cylinder may also be omitted, but I prefer to employ the full number of cylinders on each set, as it enables the apparatus to be adapted to changes in ingredients and characteristics by simply changing the plungers.

Suitable graduated scales and pointers may be arranged for indicating visually the extent of the relative movement of the bars $o$ and also for translating such relative movement into percentages, but as such devices form no part of the present invention they are not shown.

In Figs. 8–12 I have shown a form of apparatus adapted to use sand or fine shot instead of water. A A′ A², B B′ B² and C C′ C² are sets of characteristic cylinders or holders corresponding to the sets of cylinders $a$ $a'$ $a^2$, $b$ $b'$ $b^2$ and $c$ $c'$ $c^2$ of the apparatus shown in Figs. 1–4. Each of these holders is open at the top and front, and adjacent to the open front and movable on suitable guides $k^4$ is a chute open at the top and provided at the bottom with a tube D′. K K′ K² are the chutes for the holders A &c., M M′ M² those for the holders B &c., and N N′ N² those for the holders C &c. These chutes correspond with the movable plungers $k$ $k'$ &c., $m$ $m'$, &c. and $n$ $n'$ &c.

F F′ F² are receptacles corresponding to the receptacles $f$, $f'$ $f^2$ for receiving the volumes discharged from the holders representing the same characteristic in the different sets of holders.

E E′ E² are discharge tubes each extending under a row of holders representing the same characteristic in the sets of holders and discharging respectively into the receptacles F F' F². These tubes are inclined to afford a gravity flow toward the respective receptacles and are each provided with vertical branches D arranged immediately below the movable chutes K, M, N, &c. The chutes have an opening G at the bottom and are provided each with a tube D' leading from said opening and extending into the corresponding branch D of the discharge tubes E, E', E². The movable chutes in each set are connected by a common bar O which may be raised and lowered by hydraulic lifts P P' connected with each bar and controlled by suitable valves P². The outlets S from the receivers P P' P² may be opened simultaneously to discharge the contents by means of valves controlled by a common lever T.

The holders A, B, C, &c., are filled with sand or fine shot and the inner wall H of the chutes K, M, N, &c. closes the open front of the holders and retains the sand or shot in them. When, however, the chutes are lowered a portion of the sand or shot will flow from the holders through the open side over the end of the wall H into the chutes, and will pass through the tubes D' D and E &c. into the receptacles F &c. The amount of sand or shot which will thus be discharged from the holders in a set will be proportional to the extent of movement of the chutes. The horizontal sections of the holders in each set are made proportional to the ratio of the characteristics of the ingredients which the set represents. Consequently when any set of chutes is operated, there will be discharged from each holder of that set a portion of sand proportional to the characteristic which such holder represents in the ratio of characteristics in its set.

The discharged sand representing the same characteristic in the different sets will pass through the corresponding discharge tubes D' D E &c. into the receptacle representing that characteristic; and the ratio between the volumes of sand collected in the several receivers may be determined by weight or measure.

What I claim is as follows:

1. The herein described method of determining the relative proportions of substances to be mixed or compounded to produce a given ratio between the characteristics of such substances, which consists in simultaneously discharging a fluid, in separate volumes proportional to the ratio of the chosen characteristics of each ingredient, collecting together the displaced volumes representing the same characteristic of all the ingredients, and repeating the first operation for the different ingredients until there is established between the collected volumes of fluid the given ratio of the characteristics represented by such collected volumes.

2. The herein described method of determining the relative proportions of substances to be mixed or compounded to produce a given ratio between the characteristics of such substances, which consists in assembling a series of separate bodies of fluid, simultaneously discharging from said separate bodies volumes of fluid proportional to the ratio of the characteristics of such ingredient, collecting together the discharged volumes representing the same characteristic in all the ingredients and repeating the first operation for the different ingredients until there is established between the collected volumes of fluid the given ratio of the characteristics represented by such collected volumes.

3. The herein described method of determining the relative proportions of substances to be mixed or compounded to produce a given ratio between the characteristics of such substances, which consists in assembling a series of separate bodies of water in separate receptacles, simultaneously displacing from said separate bodies volumes of water proportional to the ratio of the characteristics of such ingredient, collecting together the discharged volumes representing the same characteristic in all the ingredients, and repeating the first operation for the different ingredients until there is established between the collected volumes of water the given ratio of the characteristics represented by such collected volumes.

4. In apparatus for the purpose described, the combination of a series of sets of vessels each set representing one of the ingredients of the compound, means for simultaneously discharging from the vessels of each set separate volumes of fluid proportional to the ratio of the characteristics of the ingredient represented by such set, a series of receivers, and means for separately collecting the volumes discharged from the vessels representing the same characteristic in the different sets and discharging each of such collected volumes into one of the receivers.

5. In apparatus for the purpose described, the combination of a series of sets of vessels adapted to contain liquid, each set of vessels representing one of the ingredients of the compound, a series of independently operated sets of discharging devices for discharging volumes of liquid from said vessels, the devices on each set being arranged to discharge from the corresponding set of vessels volumes proportional to the ratio of the characteristics in the ingredient represented by such set of vessels, a series of receivers, and means for separately collecting the volumes discharged from the vessels representing the same characteristic in the different sets and discharging each of such collected volumes into one of the receivers.

6. In apparatus for the purpose described, the combination of a series of sets of vessels adapted to contain liquid, each set of vessels representing one of the ingredients of the compound, discharge tubes or conduits connecting together the outlets of corresponding vessels in the different sets, a series of separate receivers, each communicating with one of said discharge tubes or conduits, and a series of independently operated sets of discharging devices for discharging volumes of liquid from said vessels, the devices in each set being arranged to discharge from the corresponding set of vessels different volumes proportional to the ratio of the characteristics in the ingredient represented by such set of vessels and discharging devices.

7. In apparatus for the purpose described, the combination of a series of sets of vessels adapted to contain liquid, each set of vessels representing one of the ingredients of the compound, discharge tubes or conduits connecting together the outlets of corresponding vessels in the different sets, a series of separate receivers, each communicating with one of said discharge tubes or conduits, and a series of independently operated sets of plungers, the plungers of each set being adapted to enter the vessels of one set, and the plungers in each set being of varying diameter proportional to the ratio of the characteristics of the ingredient represented by said set of plungers and vessels.

8. In apparatus for the purpose described, the combination of a series of sets of vessels adapted to contain liquid, each set of vessels representing one of the ingredients of the compound, a series of independently operated sets of discharging devices for discharging volumes of liquid from said vessels, the devices in each set being arranged to discharge from the corresponding set of vessels volumes proportional to the ratio of the characteristics in the ingredient represented by such set of vessels, a series of receivers, means for separately collecting the volumes discharged from the vessels representing the same characteristic in the different sets and discharging each of such collected volumes into one of the receivers, and means for varying at will the cubical contents of said receivers.

9. In apparatus for the purpose described, the combination of a series of sets of vessels adapted to contain liquid, each set of vessels representing one of the ingredients of the compound, a series of independently operated sets of discharging devices for discharging volumes of liquid from said vessels, the devices in each set being arranged to discharge from the corresponding set of vessels volumes proportional to the ratio of the characteristics in the ingredient represented by such set of vessels, a series of receivers, means for separately collecting the volumes discharged from the vessels representing the same characteristic in the different sets and discharging each of such collected volumes into one of the receivers, and means for varying at will the cubical contents of said receiver consisting of separate cylindrical reducers of different diameters adapted to be introduced in said receivers.

10. In apparatus for the purpose described, the combination of a series of sets of vessels adapted to contain liquid, each set of vessels representing one of the ingredients of the compound, discharge tubes or conduits connecting together the outlets of corresponding vessels in the different rows, a series of separate receivers, each communicating with one of said discharge tubes or conduits, a series of independently operated sets of plungers, the plungers of each set being adapted to enter the vessels of one set, and the plungers in each set being of varying diameter proportional to the ratio of the characteristics of the ingredient represented by said set of plungers and vessels, and means for varying at will the cubical contents of said receivers.

11. In apparatus for the purpose described, the combination of a series of sets of vessels adapted to contain liquid, each set of vessels representing one of the ingredients of the compound, discharge tubes or conduits connecting together the outlets of corresponding vessels in the different sets, a series of separate receivers, each communicating with one of said discharge tubes or conduits, a series of independently operated sets of plungers, the plungers of each set being adapted to enter the vessels of one set, and the plungers in each set being of varying diameter proportional to the ratio of the characteristics of the ingredient represented by said set of plungers and vessels, and means for independently operating each of said sets of plungers.

12. In apparatus for the purpose described, the combination of a series of sets of vessels adapted to contain liquid, each set of vessels representing one of the ingredients of the compound, discharge tubes or conduits connecting together the outlets of corresponding vessels in the different sets, a series of separate receivers, each communicating with one of said discharge tubes or conduits, a series of independently operated sets of plungers, the plungers of each set being adapted to enter the vessels of one set, and the plungers in each set being of varying diameter proportional to the ratio of the characteristics of the ingredient represented by said set of plungers and vessels, and a separate and independently movable bar carrying each set of plungers.

In testimony of which invention, I have hereunto set my hand.

LOWNDES TAYLOR.

Witnesses:
ERNEST HOWARD HUNTER,
R. M. KELLY.